(12) United States Patent
Zhou et al.

(10) Patent No.: US 10,552,320 B2
(45) Date of Patent: Feb. 4, 2020

(54) USING A PROJECTED OUT OF MEMORY SCORE TO SELECTIVELY TERMINATE A PROCESS WITHOUT TRANSITIONING TO A BACKGROUND MODE

(71) Applicant: Intel Corporation, Santa Clara, CA (US)

(72) Inventors: Zhen Zhou, Shanghai (CN); Padmashree K Apparao, Portland, OR (US); Thomas L Carr, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 15/089,439

(22) Filed: Apr. 1, 2016

(65) Prior Publication Data

US 2017/0285977 A1    Oct. 5, 2017

(51) Int. Cl.
*G06F 12/06*    (2006.01)
*G06F 3/06*    (2006.01)

(52) U.S. Cl.
CPC ........ *G06F 12/0638* (2013.01); *G06F 3/0604* (2013.01); *G06F 3/0608* (2013.01);
(Continued)

(58) Field of Classification Search
CPC .................. G06F 12/0638; G06F 12/08; G06F 2212/1016; G06F 2212/1041;
(Continued)

(56) References Cited

U.S. PATENT DOCUMENTS 10,101,910 B1 * 10/2018 Karppanen ........... G06F 3/0604
10,248,321 B1 *  4/2019 Karppanen ............ G06F 3/061
(Continued)

FOREIGN PATENT DOCUMENTS

WO    WO-2012112331 A2 *  8/2012 ............. G06F 9/485

OTHER PUBLICATIONS

Prodduturi, "Effective Handling of Low Memory Scenarios in Android," Dept. of Computer Science and Engineering, Indian Institute of Technology, Bombay, Nov. 3, 2012, pp. 1-31.*
(Continued)

*Primary Examiner* — Glenn Gossage
(74) *Attorney, Agent, or Firm* — Hanley, Flight & Zimmerman, LLC

(57) ABSTRACT

Methods and apparatus such as a processor platform to manage a process under a memory constraint are disclosed herein. An example method includes detecting that a process is to transition from a foreground mode of operation to a background mode of operation. Without transitioning the process to the background mode of operation, a projected out of memory score is calculated. The projected out of memory score is compared to a score threshold, and the process is terminated when the projected out of memory score is greater than the score threshold. When the projected out of memory score is less than or equal to the score threshold, the process is allowed to transition to the background mode of operation. A priority adjustor may determine a projected adjustment value, for example by determining a default adjustment value, or by performing a lookup of an adjustment value currently associated with a second process operating in the background mode. The background mode of operation may be at least one of a visible application, a secondary server, a hidden application, a content provider, or an empty application. Freeing up
(Continued)

memory in advance of a subsequent low memory check ensures that low memory conditions are avoided more promptly.

21 Claims, 8 Drawing Sheets

(52) U.S. Cl.
CPC .......... *G06F 3/0634* (2013.01); *G06F 3/0673* (2013.01); *G06F 3/061* (2013.01); *G06F 2212/1041* (2013.01); *G06F 2212/171* (2013.01)

(58) Field of Classification Search
CPC ............. G06F 2212/171; G06F 3/0619; G06F 3/0689; G06F 3/0659; G06F 3/061; G06F 3/0608; G06F 3/0604; G06F 3/0673; G06F 3/0634
See application file for complete search history.

(56) References Cited

U.S. PATENT DOCUMENTS

| | | | |
|---|---|---|---|
| 2009/0113444 A1 | 4/2009 | Hackborn et al. | |
| 2012/0324481 A1 | 12/2012 | Xia et al. | |
| 2014/0143791 A1 | 5/2014 | Mark et al. | |
| 2014/0223242 A1* | 8/2014 | McKenney | G06F 9/526 714/54 |
| 2015/0067238 A1 | 3/2015 | Marcu et al. | |
| 2015/0333971 A1* | 11/2015 | Wang | H04L 41/22 715/738 |
| 2016/0371180 A1* | 12/2016 | Urmanov | G06F 12/0253 |
| 2017/0286171 A1* | 10/2017 | Apparao | G06F 9/5016 |

OTHER PUBLICATIONS

International Searching Authority, "International Search Report", issued in connection with International Application No. PCT/US2017/020205, dated May 31, 2017, 3 pages.

International Searching Authority, "Written Opinion", issued in connection with International Application No. PCT/US2017/020205, dated May 31, 2017, 9 pages.

* cited by examiner

400

| MEMORY THRESHOLD 410 | SCORE THRESHOLD 415 |
|---|---|
| 58 MB | 0 |
| 90 MB | 5 |
| 200 MB | 15 |

430 → 58 MB row
440 → 90 MB row
450 → 200 MB row

FIG. 4

| PROCESS ID | MEMORY USAGE | OOM ADJ | OOM SCORE |
|---|---|---|---|
| 123 | 64 MB | -1 | 0 |
| 789 | 384 MB | 6 | 12 |
| ... | ... | ... | ... |

FIG. 6

USING A PROJECTED OUT OF MEMORY SCORE TO SELECTIVELY TERMINATE A PROCESS WITHOUT TRANSITIONING TO A BACKGROUND MODE

FIELD OF THE DISCLOSURE

This disclosure relates generally to memory management, and, more particularly, to methods and apparatus to manage a process under a memory constraint.

BACKGROUND

Application launch time is a critical component of user perception of the user experience of computing devices such as, for example, devices utilizing the GOOGLE Android™ platform. When an application takes a long time to start, a user might become frustrated with the application and/or the computing device. Such user frustration may drive users to discontinue use of the application and/or computing device.

BRIEF DESCRIPTION OF THE DRAWINGS

FIG. 4 is a data table illustrating example out of memory score thresholds in connection with memory limits.

FIG. 6 is a data table identifying out of memory adjustment values in connection with different process states.

The figures are not to scale. Wherever possible, the same reference numbers will be used throughout the drawing(s) and accompanying written description to refer to the same or like parts.

DETAILED DESCRIPTION

Figure 1:
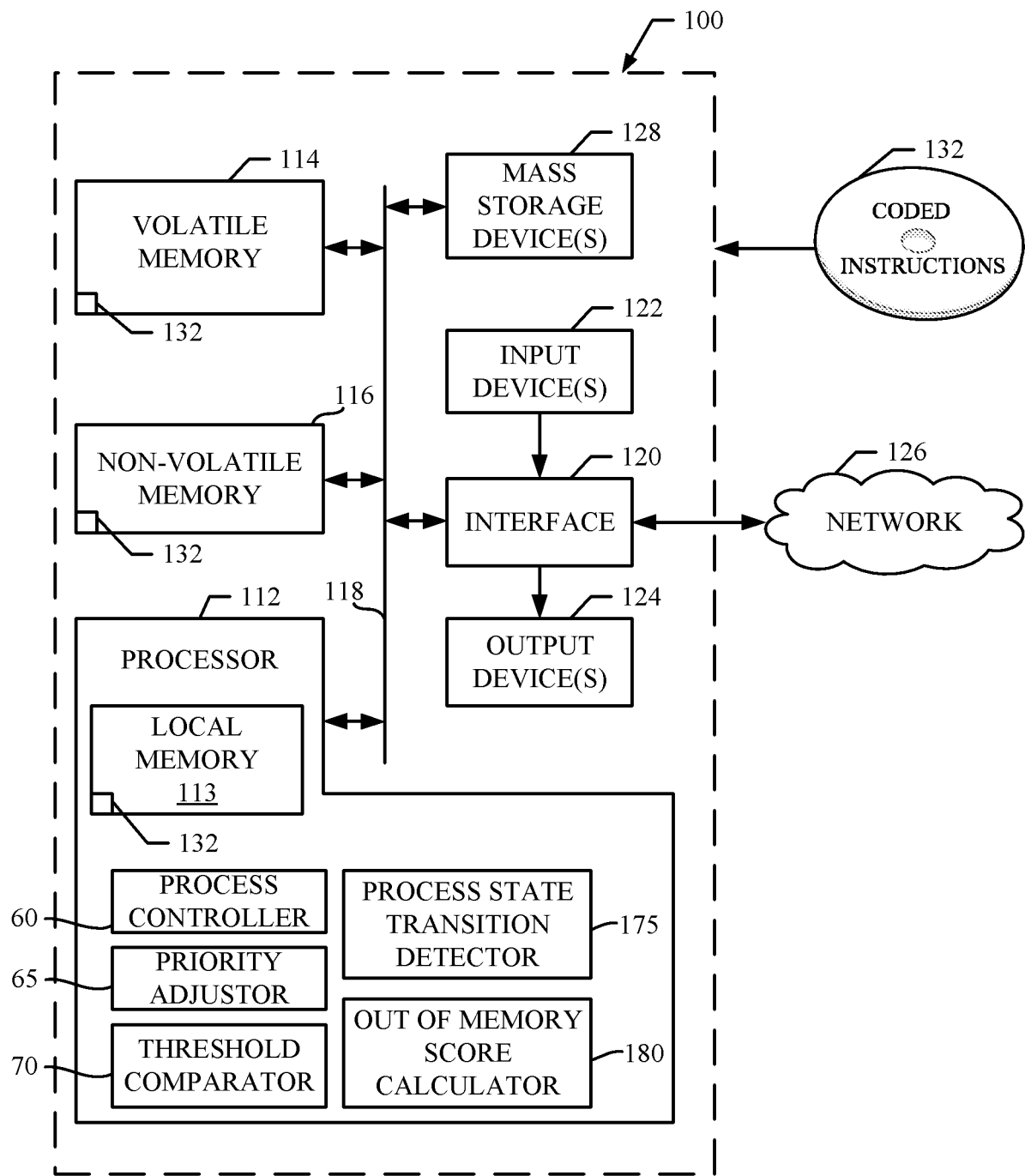
FIG. 1 is a block diagram of an example processor platform structured according to the teachings of this disclosure to manage a process under a memory constraint.

Application launch time is a critical component of user perception of the user experience of computing devices such as, for example, devices utilizing the GOOGLE Android™ platform. Applications tend to launch more quickly when memory resources are available to the application. In examples disclosed herein, applications (sometimes referred to as "apps") utilize one or more processes to provide application functionality. To ensure that memory resources are available, the GOOGLE Android™ platform utilizes a low memory killer to, when available memory is low, terminate processes according to an ordered priority of those processes. While examples disclosed herein refer to the GOOGLE Android™ platform, any other computing platform may additionally or alternatively be used such as, for example, a MICROSOFT Windows® operating system, an APPLE Macintosh® operating system, a LINUX operating system, etc.

A process may be considered as being executed in one of a number of different states at a given time. For example, in the GOOGLE Android™ platform, processes may be executed as a foreground application, as a visible application, as a secondary server, as a hidden application, as a content provider, or as an empty application. A process executing as a foreground application is a process that is currently being displayed on a display of the computing device (or an external display). A process executing as a visible application is a process actively being executed and is displayed on a display of the computing device (or an external display), but that is not associated with an application window that is in focus. A process that is executing as a secondary server is a process that is standing at the ready to perform a task, but is not actively performing that task. An example secondary server process may include, for example, a clock application, a background synchronization application (e.g., an email client), a music player application, etc. A process that is executing as a hidden application is a process that is currently executing, but is not visible. A process that is executing as a content provider is a process that supplies information to another process (e.g., a foreground application). A process that is executing as an empty application is an application that has been closed, but is preserved in memory such that re-starting the application does not require re-loading information into memory.

As used herein, a process that is executing as a foreground application is referred to as being executed in the foreground. Also, as used herein, a process that is not executing as a foreground application (e.g., is executed as a visible application, as a secondary server, as a hidden application, as a content provider, or as an empty application) is referred to as being executed in the background.

When memory is low, a process controller terminates processes. In examples disclosed herein, the process controller may periodically and/or aperiodically perform a memory check to determine whether memory is to be reclaimed. In examples disclosed herein, the process controller terminates processes according to an order of priority. In examples disclosed herein, different levels of priority are given to processes based on the state at which the processes are currently executing. For example, to reclaim memory, a process executing as a background application would typically be terminated before a foreground application is terminated. To decide which process to terminate first, an out of memory (OOM) score is calculated. The OOM score is based on, for example, an amount of memory utilized by the process, the state of the process, and an adjustment value based on the state of the process. In examples disclosed herein, a process that is using a large amount of memory in the background might receive a higher score than a process that is using a same amount of memory in the foreground. In examples disclosed herein, a higher score indicates a higher likelihood that the process should be terminated to free memory. System related processes will typically receive very low scores, whereas user initiated processes will typically receive higher scores. As a result, user initiated processes will typically be terminated to free memory before system processes, thereby ensuring stability of the system (e.g., preventing crashes).

In examples disclosed herein, a process may be transitioned from a foreground state to a background state. Such a transition may occur when, for example, a user pushes a button (e.g., a home button, a start button, etc.) of the computing device. While executed in the foreground state, the process may receive a first OOM score, whereas once transitioned to the background state, the process may receive a second OOM score greater than the first OOM score. Such a higher score indicates that the process, when moved to the background, has a different (e.g., greater) likelihood of being terminated than if it were executed in the foreground. However, existing approaches wait for the process to be stopped and moved to the background before calculation of the second OOM score. In some cases, a process may be transitioned to the background only to be terminated shortly thereafter. As a result, additional resources (e.g., processor cycles, memory addresses) are utilized when a process is transitioned to a background state without determining whether such a transition would cause the process to be terminated.

In examples disclosed herein, upon detecting that a process is to be transitioned to the background, the process controller determines whether such transition would likely result in the process being terminated. To enable such determination, a projected OOM score is calculated based on an amount of memory utilized by the process and a default adjustment value corresponding to a process executed in the background. In examples disclosed herein, the default adjustment value is six, on a scale of negative seventeen through positive fifteen. Additionally or alternatively, a lookup of the adjustment value specific to the process to be transitioned may be performed. The projected OOM score represents an expected OOM score of the process once it is transitioned to the background and, accordingly, can be used at the time of transitioning the process to the background to determine whether the process should be allowed to transition or should be terminated.

FIG. 1 is a block diagram of an example processor platform 100 capable of executing the instructions described below in connection with FIGS. 2, 3, 5, 7, and/or 8 to manage a process under a memory constraint. The processor platform 100 can be, for example, a personal computer, a mobile device (e.g., a cell phone, a smart phone, a tablet such as an iPad™), a personal digital assistant (PDA), an Internet appliance, a digital versatile disk (DVD) player, a compact disk (CD) player, a digital video recorder, a Blu-ray Disc™ player, a gaming console, a personal video recorder, a set top box, or any other type of computing device.

The processor platform 100 of the illustrated example includes a processor 112. The processor 112 of the illustrated example is hardware. For example, the processor 112 can be implemented by one or more integrated circuits, logic circuits, microprocessors or controllers from any desired family or manufacturer. In the illustrated example of FIG. 1, the processor 112 includes a process controller 160, a threshold comparator 170, a process state transition detector 175, a priority adjustor 165, and an out of memory score calculator 180. In examples disclosed herein, the example process controller 160, the example threshold comparator 170, the example process state transition detector 175, the example out of memory score calculator 180, and the example priority adjustor 165 are implemented as components of the processor 112. However, in some examples, the example process controller 160, the example threshold comparator 170, the example process state transition detector 175, the example out of memory score calculator 180, and/or the example priority adjustor 165 are implemented by circuitry(ies) that are separate from the processor 112.

The processor 112 of the illustrated example includes a local memory 113 (e.g., a cache). The processor 112 of the illustrated example is in communication with a main memory including a volatile memory 114 and a non-volatile memory 116 via a bus 118. Processes executed by the processor 112 store data in the volatile memory 114 and/or in the non-volatile memory 116. Utilization of the volatile memory 114 and/or or the non-volatile memory 116 by a process(es) executed by the processor 112 is controlled by the process controller 160. The volatile memory 114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 116 may be implemented by flash memory and/or any other desired type of non-volatile memory device. Access to the main memory 114, 116 is controlled by a memory controller.

The example process controller 160 of the illustrated example of FIG. 1 controls process execution of the processor 112. In particular, the example process controller 160 terminates a process when, for example, low memory conditions are detected. In examples disclosed herein, in addition to detecting low memory conditions, the example process controller 160 utilizes a threshold comparison performed by the threshold comparator 170 comparing an OOM score and/or a projected OOM score of a process against an OOM threshold that is based on the amount of available memory.

The example threshold comparator 170 of the illustrated example of FIG. 1 compares a current amount of available memory to one or more memory thresholds to determine if the current amount of available memory is less than or equal to the one or more memory thresholds (e.g., if low memory conditions are detected). Example memory thresholds are discussed below in connection with FIG. 4. While in examples disclosed herein, the memory thresholds are compared with respect to an amount of available memory, any other approach to performing a memory comparison may additionally or alternatively be used such as, for example, a comparison identifying a low memory condition when an amount of memory used is greater than or equal to a threshold may be used. In examples disclosed herein, the threshold comparator 170 additionally compares an OOM score calculated by the OOM score calculator 180 to a score threshold corresponding to an available memory threshold that was not exceeded.

The example process state transition detector 175 of the illustrated example of FIG. 1 detects when a process is to transition from the foreground to the background. In examples disclosed herein, the example process state transition detector 175 monitors an input device 122 of the illustrated example of FIG. 1 to detect when, for example, a user has pressed a home button. Additionally or alternatively, any other input and/or indication that a process is to transition from the foreground to the background may additionally or alternatively be used to detect when a process is to transition from the foreground to the background.

The example out of memory (OOM) score calculator 180 of the illustrated example of FIG. 1 determines an OOM score and/or a projected OOM score for a process. In examples disclosed herein, the OOM score calculator 180 calculates the OOM score and the projected OOM score based on a percentage of the volatile memory 114 utilized by a process. In examples disclosed herein, the OOM score calculator 180 identifies the percentage scaled to a range of zero (corresponding to zero percent of the volatile memory 114 being utilized by the process) to sixteen (corresponding to one hundred percent of the volatile memory 114 being utilized by the process). However, any other range of values may additionally or alternatively be used. For example, a range from zero to one thousand may be used. The OOM score calculator 180 then adds an adjustment value, provided by the priority adjustor 165, to the scaled percentage.

The example priority adjustor 165 of the illustrated example of FIG. 1 determines a priority adjustment to be used when calculating the OOM score and/or the projected OOM score. To provide an adjustment value for calculation of the OOM score, the example priority adjustor 165 performs a lookup of a priority adjustment value for a process based on its current state of operation (e.g., a foreground application, a visible application, a secondary server, a hidden application, a content provider, an empty application, etc.). In examples disclosed herein, the lookup is performed by reading a value stored at /proc/<pid>/oom_adj, where <pid> is an identifier of the process. However, any other approach may additionally or alternatively be used.

To provide an adjustment value for calculation of the projected OOM score, the priority adjustor 170 determines a default adjustment for a background application. That is, the current state of the process is not used to determine the adjustment value when the process is about to transition to the background. If, for example, the current state of the process were used, the process would be identified as operating in the foreground (e.g., it has not yet transitioned to the background such that the value at /proc/<pid>/oom_adj will reflect the adjustment corresponding to foreground operation of the process), and would likely receive a low adjustment. In examples disclosed herein, the default adjustment is six. However, any other adjustment value may additionally or alternatively be used. As noted above, the adjustment values range from −17 to +15. However, any other range may additionally or alternatively be used.

In examples disclosed herein, a default adjustment for a background application is used because, for example, the process may be transitioned to one of multiple different background states of operation (e.g., a visible application, a secondary server, a hidden application, a content provider, an empty application, etc.). Each of those different background states of operation might have different adjustment values. In some examples, a likely projected state of operation is determined, and a lookup is performed to determine the adjustment value corresponding to the projected state of operation.

Returning to the OOM score calculator 180, when factoring in the adjustment score, a first relatively important process (e.g., a process having an adjustment of negative five) that is utilizing a quarter of the volatile memory 114 (e.g., receiving a scaled percentage of four), will result in an OOM score of negative one. Conversely, a second process with lesser importance than the first process (e.g., a process having an adjustment of positive five) that is utilizing very little memory (e.g., receiving a scaled percentage of zero), will result in an OOM score of five. If, for example, low memory conditions were present such that processes with a score of seven or greater were to be terminated, neither the first process nor the second process would be terminated. However, utilizing techniques disclosed herein, if the first process were to transition to the background, a default adjustment value (e.g., a value of six) would be used, resulting in a projected OOM score of ten (e.g., the scaled percentage of four plus the default adjustment value of six). Assuming that low memory conditions existed such that processes with a score of seven or greater were to be terminated, the first process would be terminated by the process controller 160 prior to transitioning to the background.

In contrast, if the techniques disclosed herein were not utilized upon transition of the first process from the foreground to the background, the first process would not be terminated prior to the transition. Instead, the first process would be allowed to transition to the background and then be terminated at a later time. Utilizing techniques disclosed herein, terminating the first process prior to the transition to the background ensures that processes are not transitioned to the background only to be terminated shortly thereafter. Such an approach enhances operation of the computing platform 100, because volatile memory is freed more quickly in a low memory situation.

In the illustrated example of FIG. 1, the processor platform 100 of the illustrated example also includes an interface circuit 120. The interface circuit 120 may be implemented by any type of interface standard, such as an Ethernet interface, a universal serial bus (USB), a cellular interface, a BLUETOOTH® interface, and/or a peripheral component interconnect (PCI) express interface.

In the illustrated example, one or more input devices 122 are connected to the interface circuit 120. The input device(s) 122 permit(s) a user to enter data and commands into the processor 112. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 124 are also connected to the interface circuit 120 of the illustrated example. The output devices 124 can be implemented, for example, by display devices (e.g., a light emitting diode (LED), an organic light emitting diode (OLED), a liquid crystal display, a cathode ray tube (CRT) display, a touchscreen, a tactile output device), a printer and/or speakers. The interface circuit 120 of the illustrated example, thus, typically includes a graphics driver card, a graphics driver chip or a graphics driver processor.

The interface circuit 120 of the illustrated example also includes a communication device such as a transmitter, a receiver, a transceiver, a modem and/or network interface card to facilitate exchange of data with external machines (e.g., computing devices of any kind) via a network 126 (e.g., an Ethernet connection, a digital subscriber line (DSL), a telephone line, coaxial cable, a cellular telephone system, etc.).

The processor platform 100 of the illustrated example also includes one or more mass storage devices 128 for storing software and/or data. Examples of such mass storage devices 128 include floppy disk drives, hard drive disks, compact disk drives, Blu-ray Disc™ disk drives, redundant array of inexpensive disks (RAID) systems, and digital versatile disk (DVD) drives.

The coded instructions 132 described below in connection with FIGS. 2, 3, 5, 7, and/or 8 may be stored in or on the mass storage devices 128, in the volatile memory 114, in the non-volatile memory 116, and/or on a removable tangible computer readable storage medium such as a CD or DVD.

While an example manner of implementing the example processor platform 100 is illustrated in FIG. 1, one or more of the elements, processes and/or devices illustrated in FIG.

1 may be combined, divided, re-arranged, omitted, eliminated and/or implemented in any other way. Further, while the processor 112 of the illustrated example is hardware, any of the example process controller 160, the example threshold comparator 170, the example process state transition detector 175, the example out of memory score calculator 180, and/or the example priority adjustor 165 of FIG. 1 may be implemented by hardware, software, firmware and/or any combination of hardware, software and/or firmware. Thus, for example, any of the example process controller 160, the example threshold comparator 170, the example process state transition detector 175, the example out of memory score calculator 180, and/or the example priority adjustor 165 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example process controller 160, the example threshold comparator 170, the example process state transition detector 175, the example out of memory score calculator 180, and/or the example priority adjustor 165 of FIG. 1 is/are hereby expressly defined to include a tangible computer readable storage device or storage disk such as a memory, a digital versatile disk (DVD), a compact disk (CD), a Blu-ray Disc™ disk, etc. storing the software and/or firmware. Further still, the example processor platform 100 of FIG. 1 may include one or more elements, processes and/or devices in addition to, or instead of, those illustrated in FIG. 1, and/or may include more than one of any or all of the illustrated elements, processes and devices.

Flowcharts representative of example machine readable instructions used in implementing the example processor platform 100 of FIG. 1 are shown in FIGS. 2, 3, 5, 7, and/or 8. In these examples, the machine readable instructions comprise a program(s) for execution by a processor such as the processor 112 shown in the example processor platform 100 of FIG. 1. The program may be embodied in software stored on a tangible computer readable storage medium such as a compact disc-read only memory (CD-ROM), a floppy disk, a hard drive, a digital versatile disk (DVD), a Blu-ray Disc™ disk, or a memory associated with the processor 112, but the entire program and/or parts thereof could alternatively be executed by a device other than the processor 112 and/or embodied in firmware or dedicated hardware. Further, although the example program is described with reference to the processor platform 100 illustrated in FIG. 1, many other methods or processes may alternatively be used in implementing the example processor platform 100. For example, the order of execution of the blocks may be changed, and/or some of the blocks described may be changed, eliminated, or combined.

As mentioned above, the example processes of FIGS. 2, 3, 5, 7, and/or 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 2, 3, 5, 7, and/or 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 2:
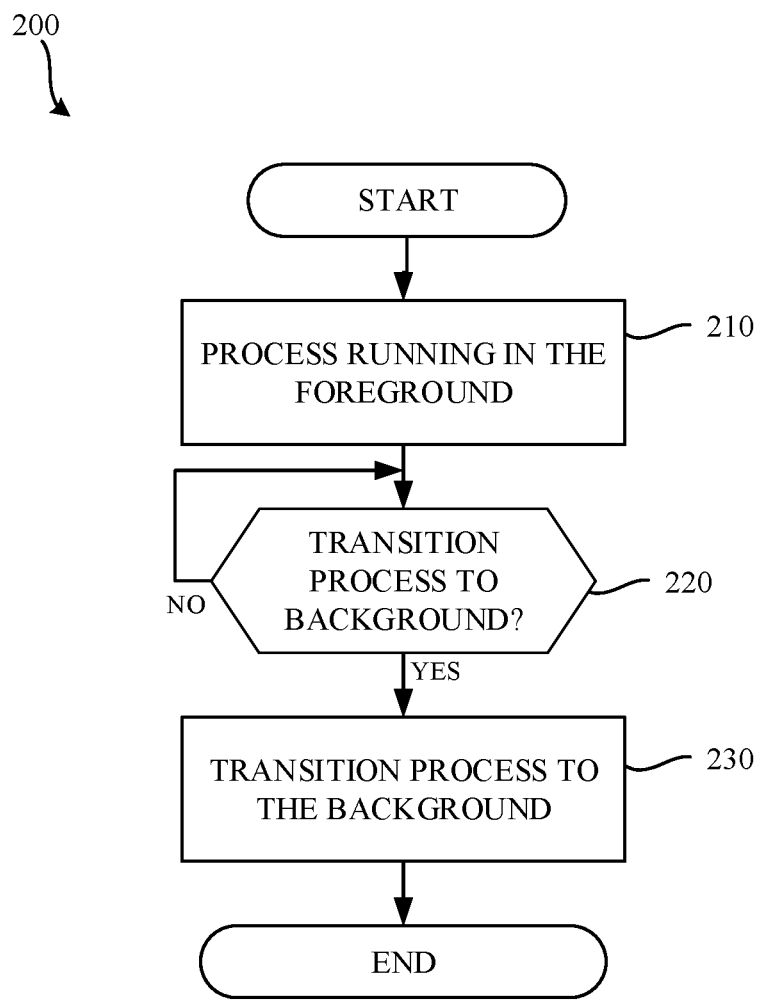
FIG. 2 is a flowchart representative of machine-readable instructions which, when executed, cause the example processor platform of FIG. 1 to transition a process from foreground operation to background operation.

FIG. 2 is a flowchart representative of machine-readable instructions which, when executed, cause the example processor platform 100 of FIG. 1 to perform an example process 200 to transition a process from foreground operation to background operation. The example process 200 of FIG. 2 begins when an example process is being executed in the foreground (Block 210). In examples disclosed herein, a process is considered to be running (e.g., executed) in the foreground when a state of the process is "Foreground App." A process receives a state of "Foreground App" when it is actively being executed and is being displayed as the topmost application on a display of the processing platform 100.

The example process state transition detector 175 shown in FIG. 1 determines whether to transition the process to background operation (Block 220). The example process state transition detector 175 identifies that the process is to be transitioned to the background when, for example, a home button is pressed, a telephone call is incoming, another process is transitioned to the foreground, an onPause( ) function is to be executed, an onStop( ) function is to be executed, etc. If the process is not to transition to the background (Block 220 returns a result of NO), the process continues execution in the foreground (e.g., as a "Foreground App"). If the process is to transition to the background (Block 220 returns a result of YES), the process is transitioned to the background (Block 230) by the process controller 160 shown in FIG. 1. In examples disclosed herein, transitioning the process to the background involves marking the state of the process as a state other than "Foreground App". By marking the process as being in a state other than "Foreground App," the process may, for example, be allocated less processor resources, not be allowed access to a display, etc. The example process 200 of FIG. 2 then terminates.

Figure 3:
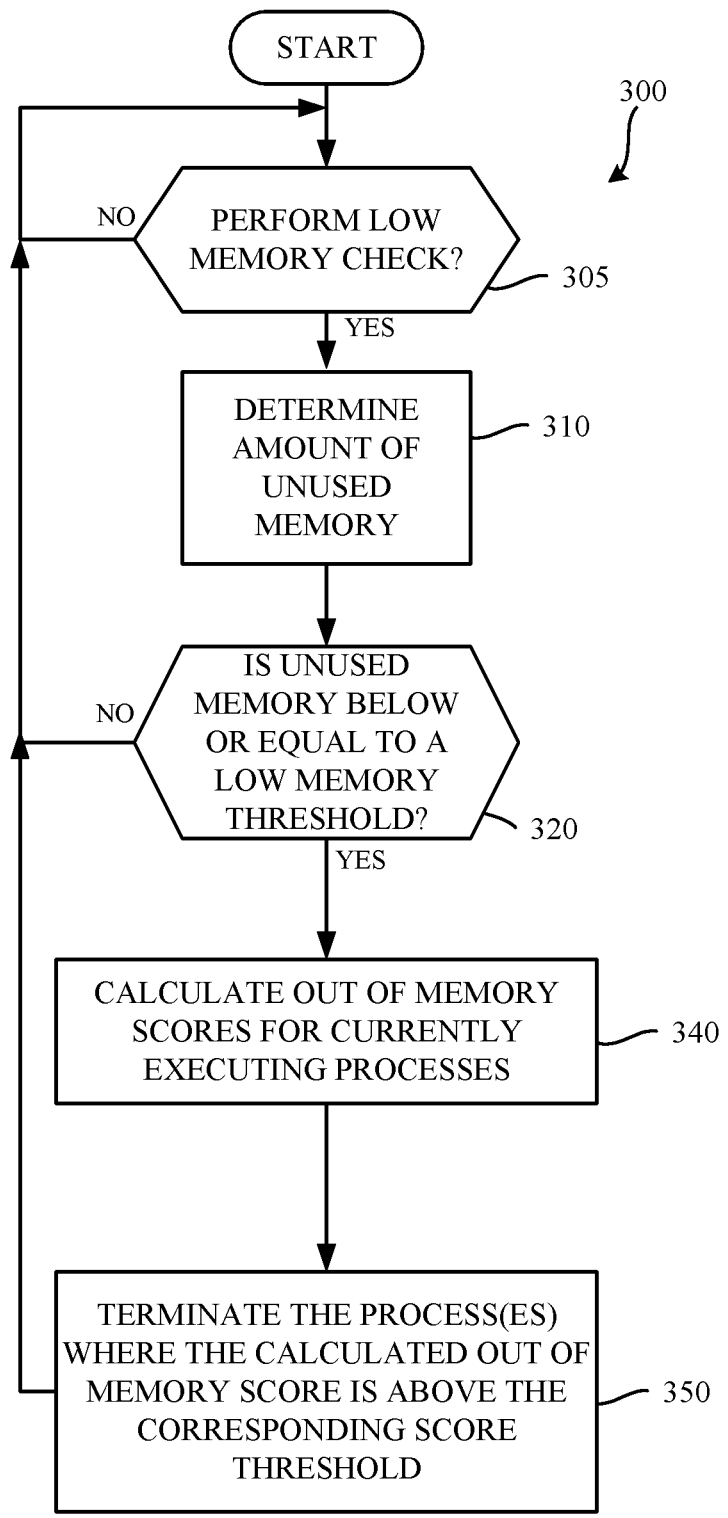
FIG. 3 is a flowchart representative of machine-readable instructions which, when executed, cause the example processor platform of FIG. 1 to identify processes for termination during low memory conditions.

FIG. 3 is a flowchart representative of machine-readable instructions which, when executed, cause the example processor platform 100 of FIG. 1 to perform an example process 300 to identify processes for termination during low memory conditions. The example process 300 of FIG. 3 begins when the process controller 160 determines whether to perform a low memory check (Block 305). In examples disclosed herein, the determination to perform the low memory check is made periodically (e.g., every twenty seconds, every minute, etc.). However, the determination to perform a memory check may be made in any other manner such as, for example, in response to an application being opened, in response an application being closed, etc. If no check is to be performed, the example process controller 160 waits until the next determination to perform the low memory check is made. In examples disclosed herein, a process may be transitioned from foreground operation to background operation shortly after a prior low memory check and, as such, may unnecessarily reside in memory until the next low memory check is performed.

If the low memory check is to be performed (Block 305 returns a result of YES), the example process controller 160 determines an amount of unused memory. (Block 310). While the amount of unused memory is determined in the illustrated example of FIG. 3, any other memory value may additionally or alternatively be used such as, for example, cache memory, committed memory, etc. The example threshold comparator 170 determines whether the unused memory is below a low memory threshold (Block 320). While in examples disclosed herein, the memory threshold is checked in terms of unused memory, any other approach to detecting when low memory conditions exist may additionally or alternatively be used such as, for example, detecting when used memory exceeds a threshold.

In examples disclosed herein, one or more memory thresholds may be used, each signifying varying degrees of being out of memory. FIG. 4 is an example data table 400 illustrating different memory thresholds in connection with memory limits. The example table 400 includes a memory threshold column 410 identifying memory thresholds, and a score threshold column 415 identifying OOM score thresholds to be used when an amount of memory is below the memory threshold identified by the memory threshold column 410. In examples disclosed herein, the example data table 400 is stored in the mass storage devices 128 of FIG. 1. However, the example data table 400 may be stored in any other location such as, for example, the non-volatile memory 116, the volatile memory 114, a remote location (e.g., a separate server in communication via the network 126), etc. In examples disclosed herein, the example data table 400 is stored using two files. The example memory threshold column 410 is stored in a first file located at "/sys/module/lowmemorykiller/parameters/minfree", and the example score threshold column 415 is stored in a second file located at "/sys/module/lowmemorykiller/parameters/adj". However, any other approach to storing the example data table 400 may additionally or alternatively be used. For example, the example data table 400 may be stored in a single file.

In the illustrated example of FIG. 4, three rows 430, 440, 450 are shown. A first example row 430 indicates that when available memory is below fifty-eight megabytes (58 MB), processes having an OOM score greater than or equal to zero may be terminated to reclaim memory. A second example row 440 indicates that when available memory is below ninety megabytes (90 MB), processes having an OOM score greater than or equal to five may be terminated to reclaim memory. A third example row 450 indicates that when available memory is below two hundred megabytes (200 MB), processes having an OOM score greater than or equal to fifteen may be terminated to reclaim memory. While in the illustrated example of FIG. 4, memory thresholds are represented in terms of megabytes, any other unit of measure and/or approach to setting a memory threshold may additionally or alternatively be used such as, for example, using a percentage of memory available, using thresholds in gigabytes, etc. While in the illustrated example of FIG. 4, three example rows are shown, any number of rows may additionally or alternatively be used. Thus, as shown in the example table 400 of FIG. 4, different memory thresholds are associated with different out of memory score thresholds.

Returning to FIG. 3, if the amount of unused memory is not less than (below) or equal to (i.e., greater than) a low memory threshold (e.g., a memory threshold identified in the memory threshold column 410 of FIG. 4) (Block 320 returns a result of NO), control proceeds to block 305 where the example process controller 160 waits until the next determination to perform the low memory check is made (Block 305).

If the amount of unused memory is less than (below) or equal to the low memory threshold (Block 320 returns a result of YES), the example out of memory score calculator 180 calculates out of memory (OOM) scores for currently executing processes (Block 340). The OOM score is a value indicative of an order in which processes should be terminated to free memory. Higher OOM scores indicate processes that should be terminated first. An example approach to calculating an OOM score for a process is disclosed below in connection with FIG. 5. In general, processes that are using greater amounts of memory will receive higher OOM scores than processes using lesser amounts of memory.

Upon determination of the out of memory scores, the example process controller 160 terminates a process where the calculated OOM score is greater than (above) the corresponding OOM score threshold (e.g., the score threshold column 415 of FIG. 4 corresponding to the memory threshold that was violated). Such termination ensures that memory resources are freed for use by other processes. In examples disclosed herein, the process having the highest out of memory score is terminated first. However, any other approach to identifying a process for termination may additionally or alternatively be used. For example, a process having the greatest memory consumption and that has an OOM score greater than the OOM score threshold may be selected first. In some examples, multiple processes are terminated (e.g., processes that received an OOM score greater than the OOM score threshold) to free as much memory as possible during the low memory conditions. Control then proceeds to block 305 where the example process controller 160 waits until the next determination to perform the low memory check is made.

Figure 5:
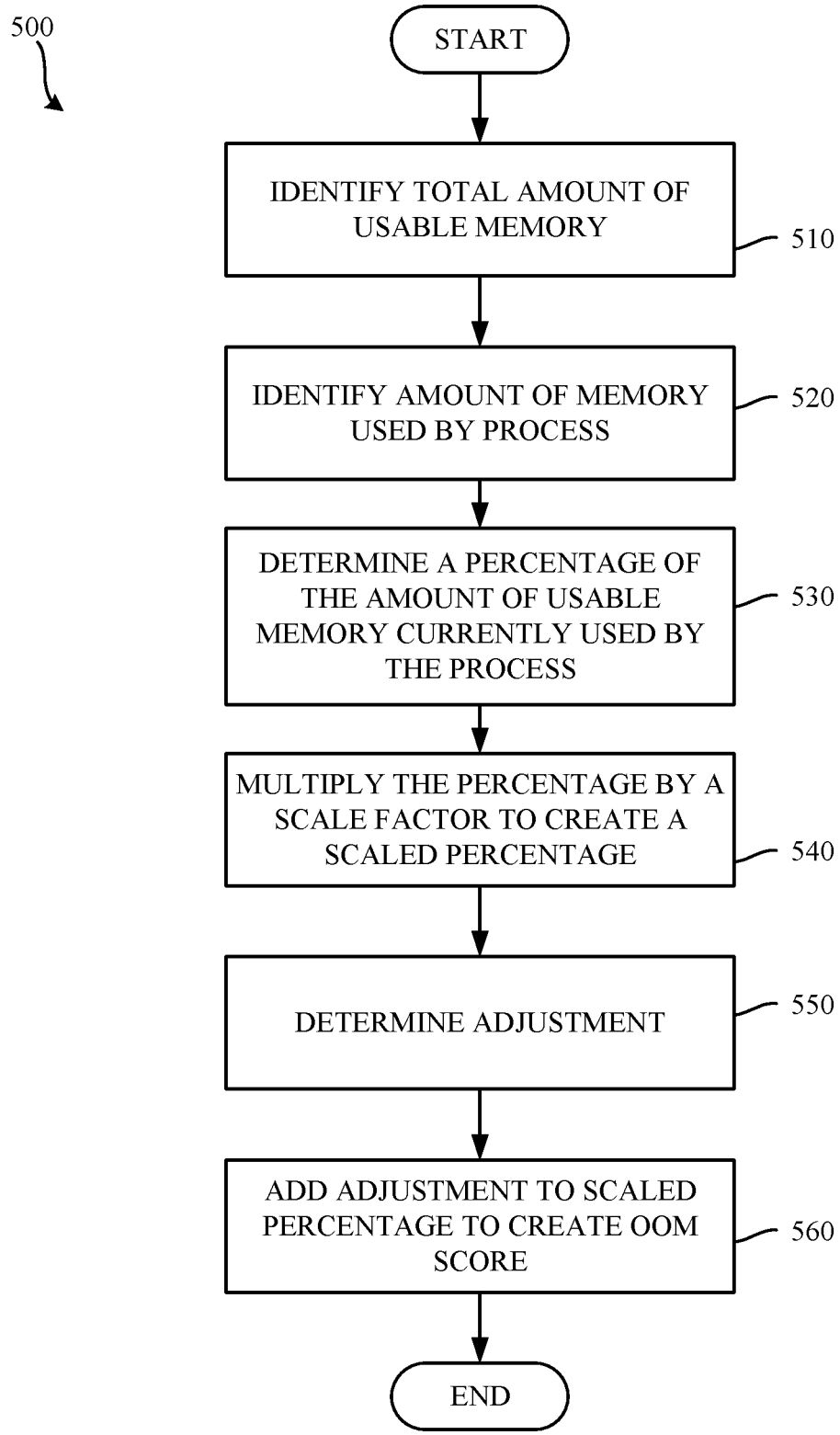
FIG. 5 is a flowchart representative of machine-readable instructions which, when executed, cause the example processor platform of FIG. 1 to calculate an out of memory (OOM) score for a process.

FIG. 5 is a flowchart representative of machine-readable instructions 500 which, when executed, cause the example processor platform 100 of FIG. 1 to calculate an out of memory (OOM) score for a process. The example process represented by the instructions 500 of FIG. 5 begins when the example out of memory score calculator 180 identifies a total amount of usable memory (Block 510). In examples disclosed herein, the total amount of usable memory corresponds to a memory capacity of the volatile memory 114. However, any other approach to identifying an amount of usable memory may additionally or alternatively be used. FIG. 6 is a data table 600 identifying example computations of OOM scores that may be determined using the example process represented by the instructions 500 of FIG. 5. The example data table 600 of FIG. 6 includes a process identifier (ID) column 610, a memory usage column 615, an OOM adjustment column 620, and an OOM score column 625. The example data table 600 of FIG. 6 identifies a first example process 640, and a second example process 650. In the illustrated example of FIG. 6, the first process 640 is executing in the foreground, while the second process 650 is executing in the background.

Returning to the example process of FIG. 5, the example out of memory score calculator 180 identifies an amount of memory used by the process in question (Block 520). In the illustrated example, the amount of memory used by the process in question corresponds to a portion of the volatile memory 114 allocated to the process. However, any other approach to identifying an amount of memory used by the process may additionally or alternatively be used. With respect to the illustrated example of FIG. 6, the first example process 640 is utilizing sixty-four megabytes (64 MB), and the second example process 650 is utilizing three hundred and eighty-four megabytes (384 MB).

The example out of memory score calculator 180 determines a percentage of the amount of usable memory currently used by the process in question by dividing the amount of memory used by the process, by the amount of usable memory (e.g., 1024 MB) (Block 530). In the illustrated example of FIG. 6, the amount of usable memory is one thousand and twenty-four megabytes (1024 MB). As a result, the first example process 640 is utilizing six and one quarter percent (0.0625 in decimal notation), while the second example process 650 is utilizing thirty-seven and one half percent (0.375 in decimal notation).

The example out of memory score calculator 180 multiplies the percentage by a scale factor to create a scaled percentage (Block 540). In examples disclosed herein, the scale factor is sixteen, resulting in a range of scaled percentage values from zero to sixteen. However, any other scale factor may additionally or alternatively be used such as, for example, a scale factor of one thousand. In the illustrated example of FIG. 5, the scaled percentage is rounded to the nearest integer. However, any other approach to rounding and/or scaling may additionally or alternatively be used. With respect to the example of FIG. 6, the first example process 640 results in a scaled percentage of one (0.0625*16=1). The second example process 640 results in a scaled percentage of six (0.375*16=6).

The example out of memory score calculator 180 determines an adjustment to be applied to the scaled percentage (Block 550). In the illustrated example, the adjustment is determined by performing a lookup of the adjustment value. In examples disclosed herein, the adjustment is on a scale of negative seventeen through positive fifteen. In some examples, the adjustment value is stored in "/proc/<pid>/oom_adj", where <pid> represents an identifier of the process. In the illustrated example of FIG. 6, the first example process 640 has a process identifier of "123", as indicated by the process identifier column 610. As a result, the adjustment value for the first example process may be stored in "/proc/123/oom_adj". The second example process 650 has a process identifier of "789". As a result, the adjustment value for the second example process may be stored in "/proc/789/oom_adj".

In examples disclosed herein, the value stored in "/proc/<pid>/oom_adj" varies based on the state of the process. For example, when a process is being executed as a foreground application, a low adjustment value (e.g., negative five, zero, one) is identified to, for example, ensure that the process is not terminated while the user is using the application. Conversely, when the process is executed in the background (e.g., as a visible application, as a secondary server, as a hidden application, as a content provider, or as an empty application), a higher adjustment value (e.g., five, six, ten, fifteen) is identified to, for example, enable the process to be identified for termination when low memory conditions arise. As shown in the illustrated example of FIG. 6, the first example process 640 receives an adjustment of −1, whereas the second example process 650 receives an adjustment of 6.

The example out of memory score calculator 180 adds the adjustment to the scaled percentage to create the OOM score (Block 560). However, any other approach to combining the adjustment with the scaled percentage may additionally or alternatively be used. For example, the scaled percentage may be multiplied by the adjustment to create the OOM score. The example process of FIG. 5 then terminates. As shown in the example data table 600 of FIG. 6, the resultant OOM score (shown in the example OOM score column 625) for the first example process 640 is zero (e.g., 1+−1=0). The resultant OOM score for the second example process 650 is twelve (e.g., 6+6=12). With respect to the low memory thresholds described in the example data table 400 of FIG. 4, if available memory were to be below or equal to the second memory threshold 440 (which has a score threshold of five), the second example process 650 would be terminated to free memory.

Figure 7:
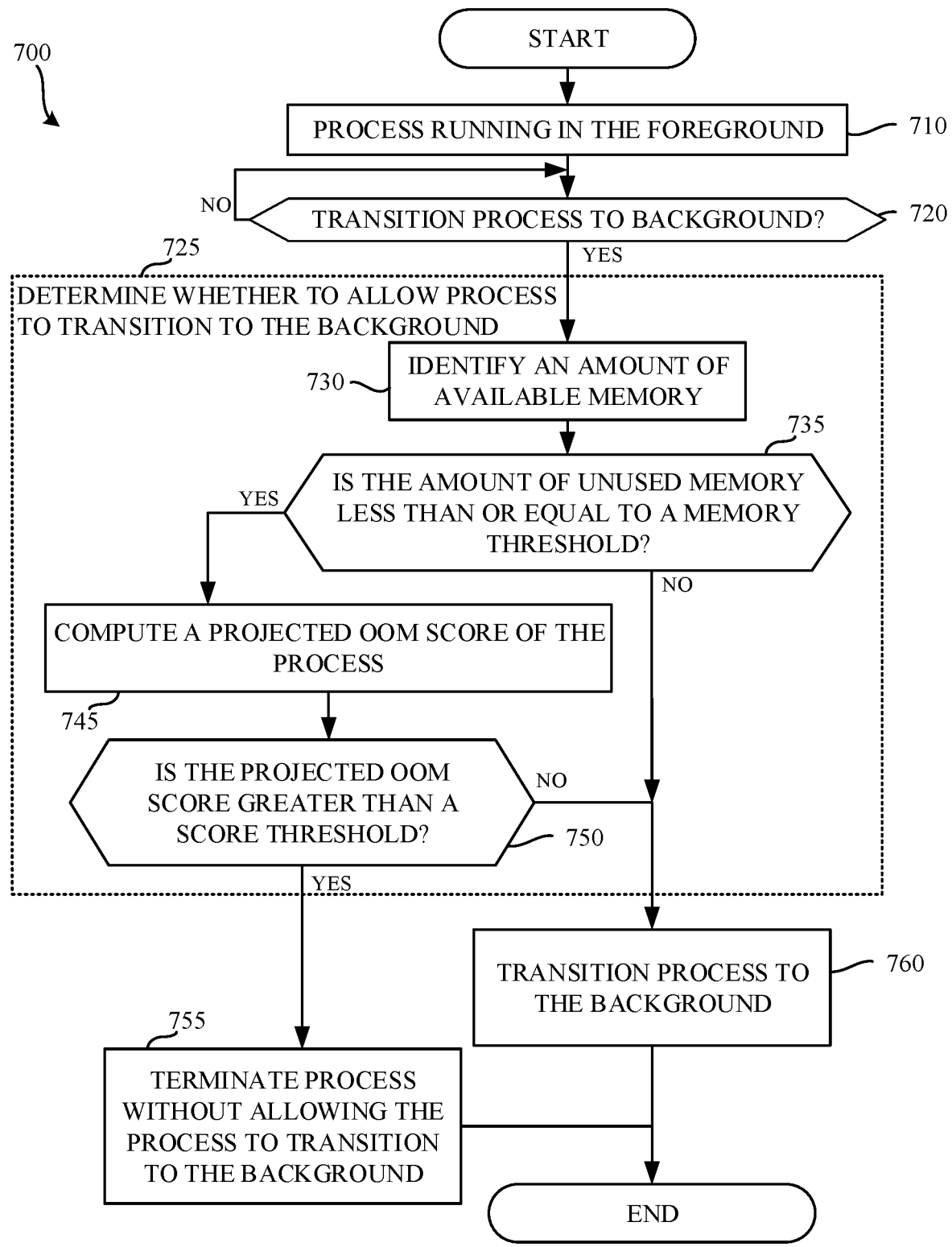
FIG. 7 is a flowchart representative of machine-readable instructions which, when executed, cause the example processor platform of FIG. 1 to determine whether to allow a process to transition from foreground operation to background operation.

FIG. 7 is a flowchart representative of machine-readable instructions which, when executed, cause the example processor platform 100 of FIG. 1 to determine whether to allow a process to transition from foreground operation to background operation. As noted above, a determination of whether to perform a low memory check is performed periodically. In some examples, an application may be transitioned from foreground operation to background operation, only to wait for the next low memory check and then be terminated. Determining whether to allow the process to transition from foreground operation to background operation reduces the likelihood that a process will be transitioned to the background, only to be terminated upon the next low memory check. Moreover, memory is freed more quickly when the processor platform 100 is under low memory conditions. Freeing memory more quickly results in improved application startup times.

Like the example process 200 of FIG. 2 described above, the example process 700 of FIG. 7 begins when a process is being executed in the foreground (Block 710). In examples disclosed herein, a process is considered to be running (e.g., executed) in the foreground when a state of the process is "Foreground App." A process receives a state of "Foreground App" when it is actively being executed and is being displayed as the topmost application on a display of the processing platform 100.

The example process state transition detector 175 detects when a process is to transition to background operation (Block 720). The example process state transition detector 175 identifies that the process is to be transitioned to the background when, for example, a home button is pressed, a telephone call is incoming, another process is transitioned to the foreground, an onPause( ) function is to be executed, an onStop( ) function is to be executed, etc. If the process is not to transition to the background (Block 720 returns a result of NO), the process continues execution in the foreground (e.g., as a "Foreground App"). If the process is to transition to the background (Block 720 returns a result of YES), instead of immediately transitioning the process to the background (as described above in connection with FIG. 2), the example process controller 120 determines whether to allow the process to transition to the background (Block 725).

To determine whether to allow the process to transition to the background, the example process controller 120 identifies an amount of available memory (Block 730). In examples disclosed herein, the amount of available memory is determined by subtracting an amount of cache memory used by all processes currently executed by the processor 112 from a total amount of memory. However, any other memory value may additionally or alternatively be used. The example threshold comparator 170 determines whether the amount of available memory is less than or equal to a memory threshold (e.g., a memory threshold shown in the example data table 400 of FIG. 4) (Block 735). In examples disclosed herein, each of the memory thresholds (e.g., the first memory threshold 430, the second memory threshold 440, the third memory threshold 450) are sequentially used to determine if one or more of the memory thresholds are violated. If the amount of unused memory is greater than the memory threshold (Block 735 returns a result of NO), a low memory condition does not exist, and the process is allowed to transition to the background by the process controller 120 (Block 760).

If the amount of unused memory is less than or equal to the memory threshold (Block 735 returns a result of YES), a low memory condition exists and further investigation of whether the transition from foreground operation to background operation is performed. The example out of memory score calculator 180 then determines a projected OOM score of the process (Block 745). The projected OOM score does not represent the current OOM score of the process, but instead projects what the OOM score of the process will be once it is transitioned to the background. An example procedure for calculation of the projected OOM score is described in further detail in connection with FIG. 8. The example threshold comparator 170 determines whether the projected OOM score is greater than a score threshold associated with a memory threshold that caused the threshold comparator 170 to return a result of YES with respect to block 735. If, for example, multiple memory thresholds are violated, the score threshold corresponding to the lowest memory threshold is used. For example, if an amount of unused memory were seventy megabytes (70 MB), both the second memory threshold 440 shown in FIG. 4 (e.g., a threshold of ninety megabytes (90 MB)) and the third memory threshold 450 (e.g., a threshold of two hundred megabytes (200 MB)), the score threshold in five (corresponding to the second memory threshold 440) would be used in the determination of block 750. Additionally or alternatively, any other score threshold may be used such as, for example, the score threshold corresponding to the highest memory threshold, a score threshold corresponding to an average of the score thresholds associated with memory thresholds that were greater than the amount of unused memory, etc.

If the projected OOM score is not greater than the score threshold (Block 750 returns a result of NO), then low memory conditions exist, but the transition of this process to the background would not likely cause the process to be terminated. Control then proceeds to block 760, where the process controller 120 transitions the process to the background (Block 760).

If the projected OOM score is greater than the score threshold (Block 750 returns a result of YES), then low memory conditions exist and the process, when transitioned to the background, would likely be terminated upon the next low memory check. Instead of allowing the process to transition to the background, the example process controller 120 terminates the process, thereby freeing memory that would otherwise be freed upon a subsequent low memory check. Freeing memory in advance of the subsequent low memory check ensures that low memory conditions are avoided more promptly than waiting for the subsequent low memory check.

Figure 8:
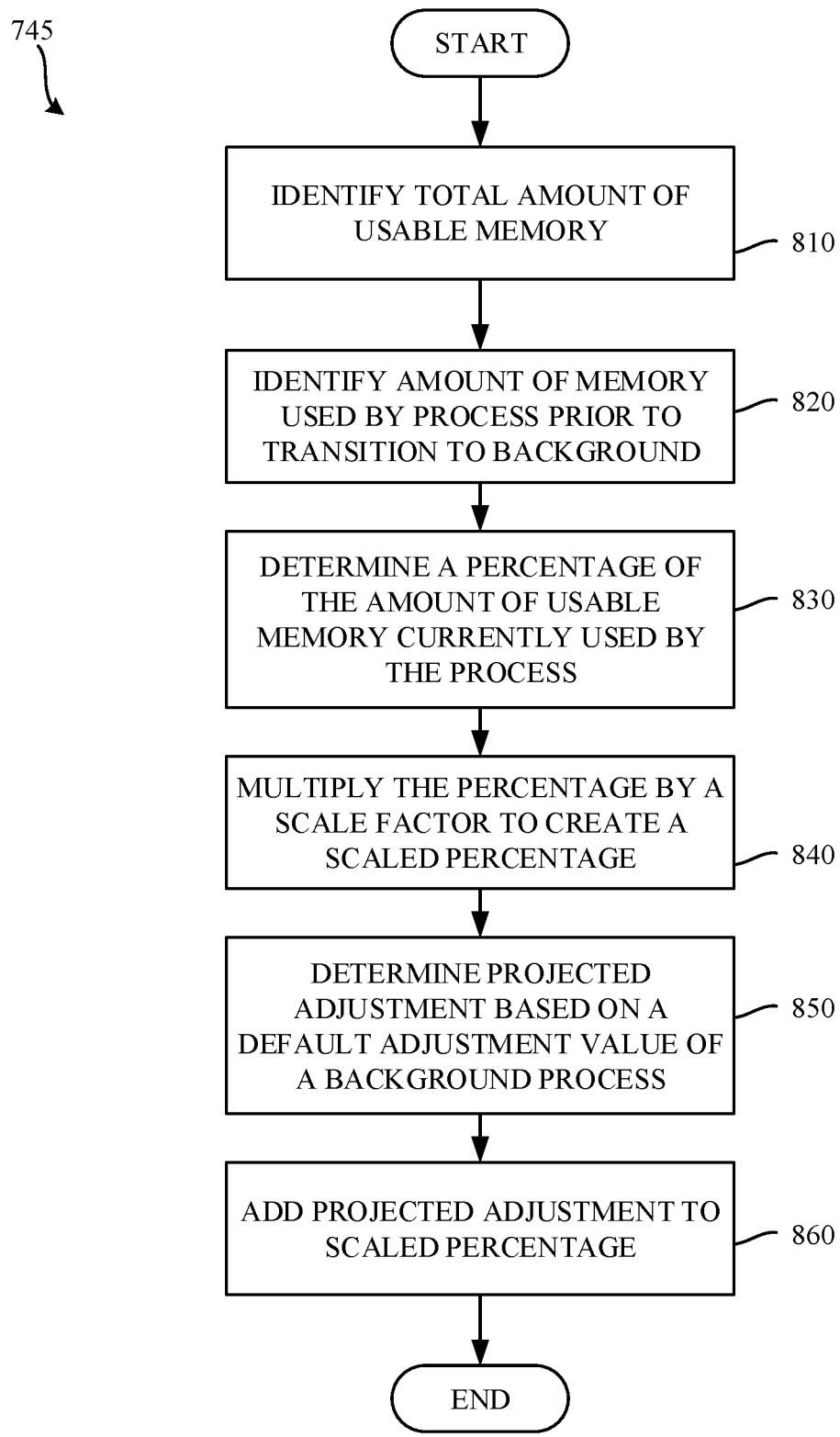
FIG. 8 is a flowchart representative of machine-readable instructions which, when executed, cause the example processor platform of FIG. 1 to calculate a projected OOM score for a process.

FIG. 8 is a flowchart representative of machine-readable instructions which, when executed, cause the example processor platform 100 of FIG. 1 to calculate a projected OOM score for a process, such as shown in block 745 in FIG. 7. The example process to calculate a projected OOM score of block 745 is executed when the example process state transition detector 175 detects that a process is to be transitioned to the background (Block 720 in FIG. 7 returns a result of YES), and the threshold comparator 170 determines that the amount of unused memory is less than or equal to a memory threshold (Block 735 in FIG. 7 returns a result of YES). In the illustrated example of FIG. 8, the example out of memory score calculator 180 identifies a total amount of usable memory (Block 810). In examples disclosed herein, the total amount of usable memory corresponds to a memory capacity of the volatile memory 116. However, any other approach to identifying an amount of usable memory may additionally or alternatively be used.

The example out of memory score calculator 180 identifies an amount of memory used by the process in question prior to the process being transitioned to the background (Block 820). In the illustrated example, the amount of memory used by the process in question corresponds to a portion of the volatile memory 116 allocated to the process. However, any other approach to identifying an amount of memory used by the process may additionally or alternatively be used.

The example out of memory score calculator 180 determines a percentage of the amount of usable memory currently used by the process in question by dividing the amount of memory used by the process, by the amount of usable memory (Block 830). The example out of memory score calculator 180 multiplies the percentage by the scale factor (e.g., sixteen, one thousand, etc.) to create a scaled percentage (Block 840). In the illustrated example of FIG. 8, the scaled percentage is rounded to the nearest integer.

The priority adjuster 165 then determines a projected adjustment to be applied to the scaled percentage (Block 850). In examples disclosed herein, the projected adjustment is determined using a default adjustment score corresponding to a background process. In contrast to the adjustment lookup described in connection with block 550 of FIG. 5, the priority adjuster 165 does not perform a lookup based on a process identifier of the process to be transitioned to the background. If, for example, a lookup were to be performed at the time of detecting the transition (e.g., prior to the transition occurring), the identified value would correspond to the adjustment value of the process while in foreground operation (i.e., not while in background operation).

In the illustrated example of FIG. 8, the projected adjustment uses a default value of six. However, any other value may additionally or alternatively be used. For example, the projected adjustment may be based on adjustment values corresponding to one or more other process (e.g., a process different than the process that is being transitioned to the background) that is/are already in background operation. Moreover, different projected adjustment values may be used depending on, for example, the state to which the process is to be transitioned. For example, a process to be transitioned from a foreground application to a visible application may receive a different projected adjustment than a process to be transitioned from a foreground application to an empty application. In examples disclosed herein, the adjustment is on a scale of negative seventeen through positive fifteen.

The example out of memory score calculator 180 adds the projected adjustment to the scaled percentage to create the OOM score (Block 860). However, any other approach to combining the adjustment with the scaled percentage may additionally or alternatively be used. For example, the scaled percentage may be multiplied by the adjustment to create the OOM score. The example process of FIG. 8 then terminates, and control returns to block 750 of FIG. 7.

If, for example, the low memory condition of seventy megabytes remaining existed (e.g., the second memory threshold 440 of FIG. 4 were violated resulting in a corresponding OOM score threshold of five), and the first example process 640 of FIG. 6 were to be transitioned to the background, a projected OOM score of six would be added to the scaled percentage of one, resulting in a projected OOM score of seven. As a result, the first example process 640 would be terminated without being allowed to transition to the background.

From the foregoing, it will be appreciated that the above disclosed methods, apparatus and articles of manufacture enable management of a process under a memory constraint. The example approaches disclosed herein enable earlier termination of processes that would be terminated due to low memory conditions when transitioned to a background mode of operation. In examples disclosed herein, a projected adjustment (e.g., an adjustment that is not based on the processes current state of operation) is used to calculate a projected OOM score. As disclosed herein, terminating a process prior to allowing the process to be transitioned to the background not only frees memory associated with the process, but also results in enhanced processor efficiency. For example, central processing unit (CPU) clock cycles associated with maintaining state information associated with the process need not be expended. Moreover, CPU clock cycles associated with transitioning the process to the background mode are not expended. Not spending CPU clock cycles on a process that is likely going to be terminated upon a subsequent low memory check enables other processes to be more responsive. For example, a graphical user interface presented in association with a process may be more responsive, resulting in an enhanced user experience.

Example 1 is a method to manage memory utilization, the method comprising detecting that a process is to transition from a foreground mode of operation to a background mode of operation. The method includes without transitioning the process to the background mode of operation, calculating a projected out of memory score. The method includes without transitioning the process to the background mode of operation, comparing the projected out of memory score to a score threshold. The method includes without transitioning the process to the background mode of operation, terminating the process when the projected out of memory score is greater than the score threshold.

Example 2 includes the subject matter of Example 1, wherein the calculating of the projected out of memory score includes determining a percentage of an amount of usable memory currently used by the process. The calculating of the projected out of memory score includes determining a projected adjustment value. The calculating of the projected out of memory score includes creating the projected out of memory score based on the percentage and the projected adjustment value.

Example 3 includes the subject matter of Example 2, wherein the determining of the projected adjustment value includes determining a default adjustment value for a background process.

Example 4 includes the subject matter of Example 2, wherein the determining of the projected adjustment value includes performing a lookup of an adjustment value currently associated with a second process operating in the background mode of operation.

Example 5 includes the subject matter of Example 4, wherein the background mode of operation is at least one of a visible application, a secondary server, a hidden application, a content provider, or an empty application.

Example 6 includes the subject matter of any one of Examples 1-5, and further includes determining the score threshold based on a low memory threshold.

Example 7 includes the subject matter of any one of Examples 1-6, and further includes, when the projected out of memory score is less than or equal to the score threshold, allowing the process to transition to the background mode of operation.

Example 8 is a processor platform comprising a process state transition detector to detect that a process executed by a processor is to transition from a foreground mode of operation to a background mode of operation. The processor platform includes an out of memory score calculator to, without transitioning the process to the background mode of operation, calculate a projected out of memory score. The processor platform includes a threshold comparator to, without transitioning the process to the background mode of operation, compare the projected out of memory score to a score threshold. The processor platform includes a process controller to, without transitioning the process to the background mode of operation, terminate the process when the projected out of memory score is greater than the score threshold.

Example 9 includes the subject matter of Example 8, wherein the out of memory score calculator determines a percentage of an amount of usable memory currently used by the process. Example 9 further includes a priority adjustor to determine a projected adjustment value, the out of memory score calculator to create the projected out of memory score based on the percentage and the projected adjustment value.

Example 10 includes the subject matter of Example 9, wherein the priority adjustor determines the projected adjustment value by determining a default adjustment value for a background process.

Example 11 includes the subject matter of Example 9, wherein the priority adjustor is to determine the projected adjustment value by performing a lookup of an adjustment value currently associated with a second process operating in the background mode of operation.

Example 12 includes the subject matter of Example 11, wherein the background mode of operation is at least one of a visible application, a secondary server, a hidden application, a content provider, or an empty application.

Example 13 includes the subject matter of any one of Examples 8-12, wherein the threshold comparator is to determine the score threshold based on a low memory threshold.

Example 14 includes the subject matter of any one of Examples 8-13, wherein the process controller is to, when the projected out of memory score is less than or equal to the score threshold, allow the process to transition to the background mode of operation.

Example 15 is at least one tangible computer-readable storage disk or storage device comprising instructions which, when executed, cause a processor to at least detect that a process is to transition from a foreground mode of operation to a background mode of operation. The instructions, when executed, further cause the processor to without transitioning the process to the background mode of operation, calculate a projected out of memory score. The instructions, when executed, further cause the processor to without transitioning the process to the background mode of operation, compare the projected out of memory score to a score threshold. The instructions, when executed, further cause the processor to without transitioning the process to the background mode of operation, terminate the process when the projected out of memory score is greater than the score threshold.

Example 16 includes the subject matter of Example 15, wherein the instructions, when executed, further cause the processor to determine a percentage of an amount of usable memory currently used by the process. The instructions, when executed, further cause the processor to determine a projected adjustment value. The instructions, when executed, further cause the processor to create the projected out of memory score based on the percentage and the projected adjustment value.

Example 17 includes the subject matter of Example 16, wherein the instructions, when executed, further cause the processor to determine the projected adjustment value by determining a default adjustment value for a background process.

Example 18 includes the subject matter of Example 16, wherein the instructions, when executed, further cause the processor to determine the projected adjustment value by performing a lookup of an adjustment value currently associated with a second process operating in the background mode of operation.

Example 19 includes the subject matter of Example 18, wherein the background mode of operation is at least one of a visible application, a secondary server, a hidden application, a content provider, or an empty application.

Example 20 includes the subject matter of any one of Examples 15-19, wherein the instructions, when executed, further cause the processor to determine the score threshold based on a low memory threshold.

Example 21 includes the subject matter of Example 15, wherein the instructions, when executed, further cause the processor to, when the projected out of memory score is less than or equal to the score threshold, allow the process to transition to the background mode of operation.

Example 22 is an apparatus comprising means for detecting that a process is to transition from a foreground mode of operation to a background mode of operation. The apparatus includes means for calculating, without transitioning the process to the background mode of operation, a projected out of memory score. The apparatus includes means for comparing, without transitioning the process to the background mode of operation, the projected out of memory score to a score threshold. The apparatus includes means for terminating, without transitioning the process to the background mode of operation, the process when the projected out of memory score is greater than the score threshold.

Example 23 includes the subject matter of Example 22, wherein the means for calculating includes means for determining a percentage of an amount of usable memory currently used by the process. The means for calculating includes means for determining a projected adjustment value. The means for calculating includes means for creating the projected out of memory score based on the percentage and the projected adjustment value.

Example 24 includes the subject matter of Example 23, wherein the means for determining the projected adjustment value include means for determining a default adjustment value for a background process.

Example 25 includes the subject matter of Example 23, further including means for performing a lookup of an adjustment value currently associated with a second process operating in the background mode of operation.

Example 26 includes the subject matter of Example 25, wherein the background mode of operation is at least one of a visible application, a secondary server, a hidden application, a content provider, or an empty application.

Example 27 includes the subject matter of any one of Examples 22-26, and further includes means for determining the score threshold based on a low memory threshold.

Example 28 includes the subject matter of Example 22, and further includes means for allowing, when the projected out of memory score is less than or equal to the score threshold, the process to transition to the background mode of operation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. At least one tangible computer-readable storage medium comprising instructions which, when executed, cause a processor to at least:
   detect that a process is to transition from a foreground mode of operation to a background mode of operation;
   without transitioning the process to the background mode of operation, calculate a projected out of memory score for the process;
   without transitioning the process to the background mode of operation, compare the projected out of memory score to a score threshold; and
   without transitioning the process to the background mode of operation, terminate the process when the projected out of memory score is greater than the score threshold, the projected out of memory score representing an estimated out of memory score if the process were to be transitioned to the background mode of operation.

2. The at least one tangible computer-readable storage medium as defined in claim 1, wherein the instructions, when executed, further cause the processor, in calculating the projected out of memory score, to:
   determine a percentage of an amount of usable memory currently used by the process;
   determine a projected adjustment value; and
   create the projected out of memory score based on the percentage and the projected adjustment value.

3. The at least one tangible computer-readable storage medium as defined in claim 2, wherein the instructions, when executed, cause the processor to determine the projected adjustment value by determining a default adjustment value for a background process.

4. The at least one tangible computer-readable storage medium as defined in claim 2, wherein the instructions, when executed, cause the processor to determine the projected adjustment value by performing a lookup of an adjustment value currently associated with a second process operating in the background mode of operation.

5. The at least one tangible computer-readable storage medium as defined in claim 4, wherein the background mode of operation is at least one of a visible application, a secondary server, a hidden application, a content provider, or an empty application.

6. The at least one tangible computer-readable storage medium as defined in claim 1, wherein the instructions, when executed, cause the processor to determine the score threshold based on a low memory threshold.

7. The at least one tangible computer-readable storage medium as defined in claim 1, wherein the instructions, when executed, allow the process to transition to the background mode of operation when the projected out of memory score is less than or equal to the score threshold.

8. A method to manage memory utilization, the method comprising:
    detecting that a process executed by a processor is to transition from a foreground mode of operation to a background mode of operation;
    without transitioning the process to the background mode of operation, calculating a projected out of memory score for the process;
    without transitioning the process to the background mode of operation, comparing the projected out of memory score to a score threshold; and
    without transitioning the process to the background mode of operation, terminating the process when the projected out of memory score is greater than the score threshold, the projected out of memory score representing an estimated out of memory score if the process were to be transitioned to the background mode of operation.

9. The method as defined in claim 8, wherein the calculating of the projected out of memory score includes:
    determining a percentage of an amount of usable memory currently used by the process;
    determining a projected adjustment value; and
    creating the projected out of memory score based on the percentage and the projected adjustment value.

10. The method as defined in claim 9, wherein the determining of the projected adjustment value includes determining a default adjustment value for a background process.

11. The method as defined in claim 9, wherein the determining of the projected adjustment value includes performing a lookup of an adjustment value currently associated with a second process operating in the background mode of operation.

12. The method as defined in claim 11, wherein the background mode of operation is at least one of a visible application, a secondary server, a hidden application, a content provider, or an empty application.

13. The method as defined in claim 8, further including determining the score threshold based on a low memory threshold.

14. The method as defined in claim 8, further including, allowing the process to transition to the background mode of operation when the projected out of memory score is less than or equal to the score threshold.

15. A processor platform comprising a hardware processor, the hardware processor including:
    a process state transition detector to detect that a process executed by the processor is to transition from a foreground mode of operation to a background mode of operation;
    an out of memory score calculator to, without the process being transitioned by the processor to the background mode of operation, calculate a projected out of memory score for the process;
    a threshold comparator to, without the process being transitioned by the processor to the background mode of operation, compare the projected out of memory score to a score threshold; and
    a process controller to, without the process being transitioned by the processor to the background mode of operation, terminate the process when the projected out of memory score is greater than the score threshold, the projected out of memory score representing an estimated out of memory score if the process were to be transitioned to the background mode of operation.

16. The processor platform as defined in claim 15, wherein the out of memory score calculator is to determine a percentage of an amount of usable memory currently used by the process, the processor platform further including:
    a priority adjustor to determine a projected adjustment value, the out of memory score calculator to create the projected out of memory score based on the percentage and the projected adjustment value.

17. The processor platform as defined in claim 16, wherein the priority adjustor is to determine the projected adjustment value by determining a default adjustment value for a background process.

18. The processor platform as defined in claim 16, wherein the priority adjustor is to determine the projected adjustment value by performing a lookup of an adjustment value currently associated with a second process operating in the background mode of operation.

19. The processor platform as defined in claim 18, wherein the background mode of operation is at least one of a visible application, a secondary server, a hidden application, a content provider, or an empty application.

20. The processor platform as defined in claim 15, wherein the threshold comparator is to determine the score threshold based on a low memory threshold.

21. The processor platform as defined in claim 15, wherein the process controller is to allow the process to transition to the background mode of operation when the projected out of memory score is less than or equal to the score threshold.

* * * * *